United States Patent
Morrison et al.

(10) Patent No.: US 8,925,049 B2
(45) Date of Patent: Dec. 30, 2014

(54) AUTOMATED WIRELESS VULNERABILITY ASSESSMENT USING HAND-HELD WIRELESS DEVICES

(75) Inventors: John S. Morrison, Crownsville, MD (US); Kyle J. Roach, Hanover, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 257 days.

(21) Appl. No.: 13/300,020

(22) Filed: Nov. 18, 2011

(65) Prior Publication Data

US 2013/0133044 A1    May 23, 2013

(51) Int. Cl.
H04L 29/06 (2006.01)
G06F 21/57 (2013.01)
H04W 12/08 (2009.01)
H04W 24/08 (2009.01)

(52) U.S. Cl.
CPC .......... G06F 21/577 (2013.01); H04L 63/1433 (2013.01); H04W 12/08 (2013.01); H04W 24/08 (2013.01)
USPC ............. 726/5; 726/1; 726/2; 726/25; 726/26

(58) Field of Classification Search
CPC ....... G06F 21/31; G06F 21/577; H04L 63/20; H04L 63/1433; H04W 12/08; H04W 24/08
USPC ........... 726/2, 25, 5, 24, 23, 1, 26; 455/67.11, 455/411, 522
See application file for complete search history.

(56) References Cited

U.S. PATENT DOCUMENTS

| | | | |
|---|---|---|---|
| 8,087,085 B2 * | 12/2011 | Hu et al. | 726/24 |
| 8,312,545 B2 * | 11/2012 | Tuvell et al. | 726/24 |
| 8,750,242 B2 * | 6/2014 | Forte et al. | 370/331 |
| 2004/0202141 A1 * | 10/2004 | Sinivaara et al. | 370/338 |
| 2005/0055568 A1 * | 3/2005 | Agrawala et al. | 713/200 |
| 2006/0019679 A1 * | 1/2006 | Rappaport et al. | 455/456.5 |
| 2009/0124284 A1 * | 5/2009 | Scherzer et al. | 455/552.1 |
| 2009/0144823 A1 * | 6/2009 | Lamastra et al. | 726/22 |
| 2009/0156209 A1 * | 6/2009 | Franklin et al. | 455/435.2 |
| 2009/0217048 A1 * | 8/2009 | Smith | 713/176 |
| 2010/0064341 A1 * | 3/2010 | Aldera | 726/1 |
| 2010/0154060 A1 * | 6/2010 | Demblewski | 726/24 |

(Continued)

OTHER PUBLICATIONS

Cheng, J., et al., "SmartSiren: Virus Detection and Alert for Smartphones," in: Proceedings of the 5th International Conference on Mobile Systems, Applications and Services, pp. 1-14, 2000.*

Primary Examiner — Mohammad A Siddiqi
(74) Attorney, Agent, or Firm — Ronald E. Prass, Jr.; Prass LLP

(57) ABSTRACT

A system and method are provided for employing a hand-held wireless device to assess a vulnerability of a wirelessly-accessible target network to intrusion and/or cyber-attack. The system and method are directed at providing discrete, covert and fully-automated wireless access to the target network via one or more wireless access points and to assessing characteristic of the one or more wireless access points and the target network in support of a vulnerability assessment. The hand-held wireless device is configured to collect appropriate data regarding the wirelessly-accessible network, including network and portal scans, and higher-level programmed data collection. The hand-held wireless device is further configured to analyze the collected data and to produce at least a first level vulnerability assessment of the target network without interaction by the user.

17 Claims, 3 Drawing Sheets

(56) References Cited

U.S. PATENT DOCUMENTS

| | | | |
|---|---|---|---|
| 2010/0328064 A1* | 12/2010 | Rogel | 340/540 |
| 2011/0034179 A1* | 2/2011 | David et al. | 455/456.1 |
| 2011/0286343 A1* | 11/2011 | Powell et al. | 370/252 |
| 2012/0019379 A1* | 1/2012 | Ben Ayed | 340/539.1 |
| 2012/0020296 A1* | 1/2012 | Scherzer et al. | 370/328 |
| 2012/0066035 A1* | 3/2012 | Stanger et al. | 705/14.1 |
| 2012/0151587 A1* | 6/2012 | Wang et al. | 726/24 |
| 2013/0047218 A1* | 2/2013 | Smith | 726/4 |
| 2013/0273938 A1* | 10/2013 | Ng et al. | 455/456.1 |
| 2014/0036841 A1* | 2/2014 | Gray | 370/329 |

\* cited by examiner

AUTOMATED WIRELESS VULNERABILITY ASSESSMENT USING HAND-HELD WIRELESS DEVICES

BACKGROUND

1. Field of the Disclosed Embodiments

This disclosure relates to systems and methods for using hand-held wireless devices to discretely scan for wireless access points and to collect various details regarding the scanned wireless access points and the networks that are accessible via those scanned wireless access points. The collected various details may include basic security implementations, signal strengths and other like details regarding the scanned wireless access points and networks.

2. Related Art

All manner of wireless devices are used to access various networks and network-connected systems via random wireless access points. There has emerged a need for entities to accurately assess certain characteristics regarding specific wireless access points and the networks that are accessible via those wireless access points.

These assessment capabilities can be used to a number of beneficial purposes. Among the benefits of assessing characteristics of a particular wireless access point is to assist commercial enterprises operating local networks, government agencies and law enforcement entities in performing overall vulnerability assessments on networks, and the systems connected thereto, that may be accessed through one or more wireless access points. Vulnerability assessments can be used to determine weaknesses in particular target local networks, or devices connected to the target local networks, in order to evaluate susceptibility of the a particular target network, or individual device in communication with the particular target network, to cyber-attack.

Conventionally, vulnerability assessments have been carried out on specific networks, or otherwise in specific network environments, using desktop computer systems or laptop computers. For example, existing programs for personal computers are available to perform extensive vulnerability scans on networks of computers. One example of such a system was developed by Tenable Network System and is marketed under the trade name Nessus® as a proprietary comprehensive vulnerability scanning program. These vulnerability assessment systems include capabilities to detect, for example, potential vulnerabilities on tested network systems that may allow an intruder into the network to gain access to, and potentially exercise control of, sensitive data in a particular targeted network system. These vulnerability assessment systems may also detect other areas of exposure including, for example, weaknesses in password protocol, to include existence of common, default or missing passwords.

Significant drawbacks exist in these conventional vulnerability assessment systems. Such conventional vulnerability assessment systems are generally very extensive requiring excessive time, and manipulation by a trained operator, in order to provide an accurate assessment. These conventional vulnerability assessment systems also generally require significant computing power. It is for this reason that the conventional vulnerability assessment systems are generally hosted on a large and conspicuous specifically-configured desktop and/or laptop computer. These computer systems are rendered more conspicuous when they are introduced into the network/workplace environment by a trained operator whose manipulation of the system is generally required to provide effective assessment and analysis of the results.

Adding to the above physical drawback in employing such conventional systems and methods is that the use of these clearly visible conventional devices, most often introduced into the network environment by the equally conspicuous outside assessor, can cause disruption in the network/workplace environment in which the evaluation device is employed. In such instances, users and administrators alike have been known to modify systems and/or individual behaviors when it is clear from the use of conspicuous methods and systems that some sort of assessment is underway.

This modification in behavior by individuals operating monitored systems and networks can have adverse effects on the results of any evaluation, which can be at least in part attributed to the conspicuously-undertaken nature of the assessment. The results of any evaluation can be, for example, improperly skewed, thereby lessening the effectiveness of the assessment.

Additionally, use of additional conspicuous evaluation devices in certain secure environments can cause an individual assessor to be harassed, or otherwise bothered, by individual system operators and/or regular security personnel, the latter including being independently detained while access and equipment protocols receive heightened scrutiny.

Another conventional manner by which vulnerability assessments are undertaken is through installation of specific hardware appliances installed on-site to perform routine vulnerability scans on the connected network and any devices connected to the network. Drawbacks to this conventional solution include that such hardware installations tend to be less agile and are rarely accessible by entities outside the specific organization, such as a company, that operates or maintains the local network.

SUMMARY OF THE DISCLOSED EMBODIMENTS

Many currently-available commercial-off-the-shelf hand-held wireless devices, such as smartphones, have capabilities to access various networks via random wireless access points. These devices further have capabilities to gather certain details regarding access to the wireless access point. Specifically, there are applications for these devices that allow them to scan for wireless network access points, or to perform network and port scans. These devices can collect details that may include basic level security implementations and/or signal strengths of the wireless access points. In this regard, information such as that which is collected by conventional vulnerability assessment means can be collected by these standard commercial hand-held wireless devices. To date, however, there is generally no application for these commercial hand-held devices to automate the process or to link together, for example, access point scanning with more detailed network/port scanning.

It would be advantageous in view of the above-identified drawbacks in conventional systems and methods for performing vulnerability assessments, and in view of the capabilities of modern-hand-held wireless device, to provide an individual user or user entity with a simple, portable, discrete and generally automated system and method for conducting at least first level vulnerability assessments on particular wirelessly-accessible networks. The disclosed systems and methods may obviate the requirement for the use of cumbersome, conspicuous, and specialized equipment, generally in the form of a desktop or laptop computer, with a particular operator, to access particular networks via wireless access points to perform vulnerability assessments.

In various exemplary embodiments, the systems and methods according to this disclosure may provide a simple solution via a user's own local hand-held wireless device, such as a commercially-available smartphone, tablet, PDA or the like, to discretely and automatically access a particular target network via one or more wireless access point to assess characteristics of the target network and the wireless access points. The assessment of these characteristics may advantageously provide a basis for, for example, a vulnerability assessment of the target network.

In various exemplary embodiments, the systems and methods according to this disclosure may provide government agencies and law enforcement entities with a capability to discretely collect data regarding a particular target network and/or wireless access point associated with the target network and to determine the target network's potential for susceptibility to cyber-attack.

In various exemplary embodiments, the systems and methods according to this disclosure may provide a capability using a wireless (Wi-Fi) receiver in a user's own local hand-held wireless device, such as a smartphone, tablet or PDA, to automatically perform at least a basic vulnerability assessment in a manner that will not be skewed by individual system participants' modification in their behavior based on a conspicuous presence of a particular assessor, and associated assessment equipment, while conducting the vulnerability assessment.

The systems and methods according to this disclosure may provide a level of automation to the assessment that would alleviate virtually all interaction between the assessor and the assessing device in completing the assessment. Such automation would have the benefit of affording the assessor an opportunity to simply begin the assessment by activating a wholly-automated process via a hand-held device, placing the hand-held device in, for example, a pocket or bag, and walking through a target area in which the vulnerability assessment is to be undertaken. Data would be collected autonomously by the hand-held device as the assessor simple passes through the area.

In various exemplary embodiments of the systems and methods according to this disclosure, the user's own local hand-held wireless device may provide an initial first level vulnerability assessment of a particular network of interest, or devices connected to the network, in order that a government agency, or law enforcement entity, may be provided with information appropriate to later run a cyber-attack on the particular network of interest.

In various exemplary embodiments, the systems and methods according to this disclosure may provide a capability for a user's own local hand-held wireless device to scan wireless access points such as, for example, Wi-Fi access points, to gather various details regarding the scanned wireless access points. The details may include, for example, basic levels of security implementation, signal strengths or other like data that may be gathered with an appropriately-automated user's own local hand-held wireless device.

In various exemplary embodiments, the systems and methods according to this disclosure may additionally provide a simple, discrete solution to assessing the vulnerabilities of a particular network. An advantage of the systems and methods according to this disclosure is that the disclosed discrete vulnerability detection means that the user of the local hand-held wireless device can detect such vulnerabilities in a given target network without alerting users of the network to the ongoing assessment process. As such, users of the network will likely be completely unaware that any vulnerability assessment is being undertaken. Another advantage of the systems and methods according to this disclosure is that they are capable of being implemented on most off-the-shelf wireless hand-held devices, including, but not limited to smartphones, tablets and PDAs having a wireless (Wi-Fi) receiver.

In various exemplary embodiments, the systems and methods according to this disclosure do not require significant computing power, or otherwise, specific training for an assessor. The simplicity of the systems and methods according to this disclosure is their ability to be implemented on virtually any commercially-available hand-held device that includes at least a Wi-Fi receiver, and to perform at least the data collection without interaction with the assessor.

In various exemplary embodiments, systems and methods according to this disclosure may also provide higher level settings to perform additional assessment options under a concept of Analysis Depth Level (ADL). Depending on the ADL, the process may be specifically automated to perform connection to individual access points, determinations of potential passwords for the individual access points, wireless packet capture and Wired Equivalent Privacy (WEP) cracking.

In various exemplary embodiments, the systems and methods according to disclosure may generally allow a user to manually commence network assessment via a specific wireless access point by activating an automated capability stored within the user's own local hand-held wireless device. Information regarding one or more wireless access points may be automatically recorded by the user's own local hand-held wireless device at specified intervals such as, for example, each 1 to 2 seconds.

Depending on a level of sophistication of the ADL, if the wireless access point is unsecured, the user's own local hand-held wireless device may automatically connect to the network and perform network and/or port scans. Otherwise, if the wireless access point is secured, and the level sophistication of the ADL supports such a capability, the user's own local hand-held wireless device may attempt to connect to the network using one or more common authentication passwords. Again, depending on the level of sophistication of the ADL, the user's own local hand-held wireless device may perform some level of wireless packet collection and/or WEP cracking via the accessed network.

In various exemplary embodiments, the user may then manually terminate the collection portion of the assessment process, or the entire assessment process. Otherwise, the collection process may be automatically stopped based on an elapsed time, or according to some other predetermined collection criterion.

In various exemplary embodiments, the systems and methods according to this disclosure may also provide an ability to basically analyze the gathered data, or to otherwise generate a detailed assessment report for export in a form that is usable by the user, or usable by an agency or entity to which the user may communicate such a report.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for discretely and automatically assessing a network vulnerability using a user's own local hand-held wireless device accessing the network via one or more wireless access points will be described, in detail, with reference to the following drawings, in which.

DETAILED DESCRIPTION OF THE DISCLOSED EMBODIMENTS

Figure 1:
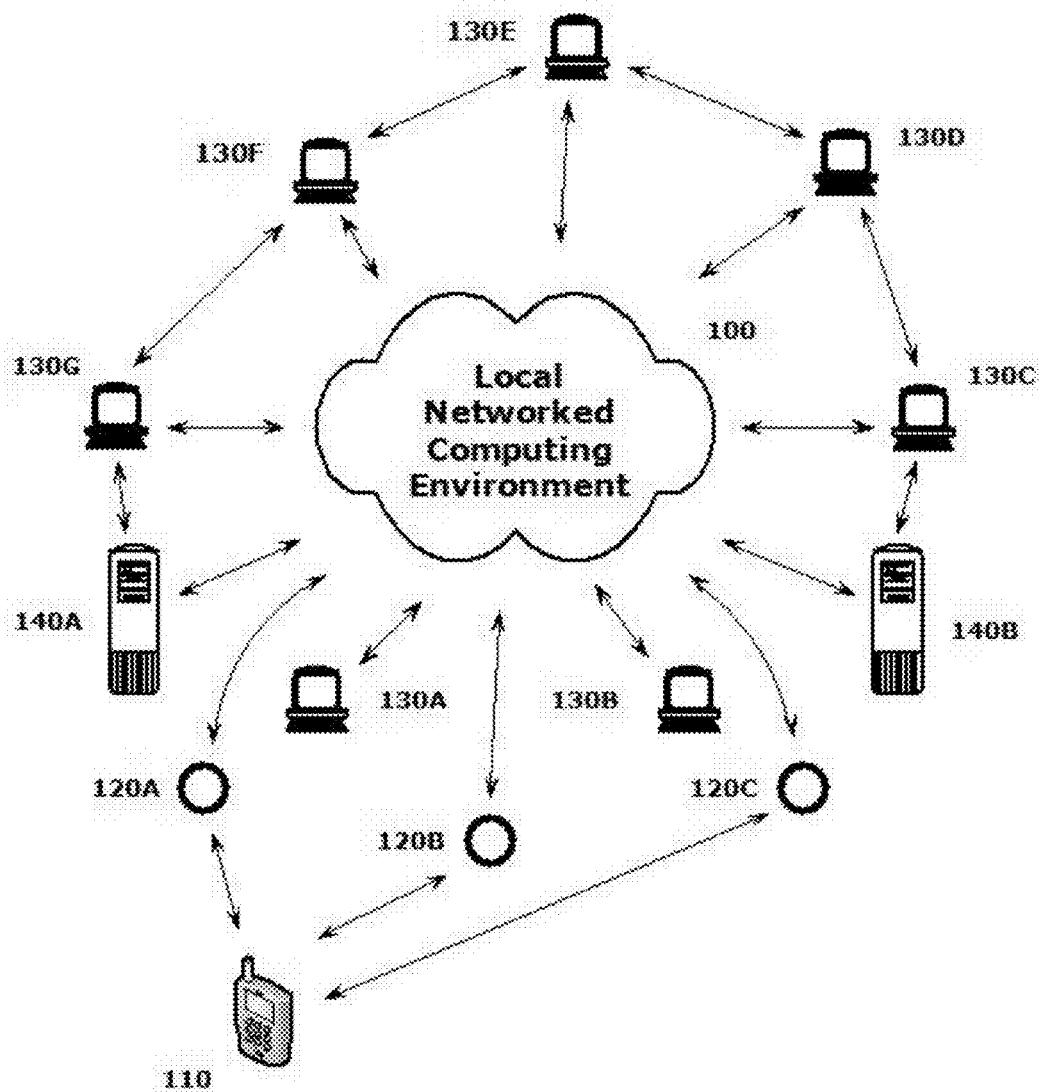
FIG. 1 illustrates a schematic diagram of an exemplary wirelessly-accessible local computer networked environment with which the systems and methods according to this disclosure may operate.

The systems and methods for discretely and automatically assessing a wirelessly-accessible network according to this disclosure will generally refer to this specific utility for those systems and methods. Exemplary embodiments described and depicted in this disclosure should not be interpreted as being specifically limited to any particular configuration, or directed to any particular intended use. In fact, any discrete detection, access and assessment tasks using, for example, a user's own local hand-held wireless device for accessing a target network via one or more wireless access points that may benefit from a part or all of the systems and methods according to this disclosure are contemplated.

Specific reference to, for example, any particular wireless device, including any particular hand-held wireless device, should be understood as being exemplary only, and not limited, in any manner, to any particular class of devices. The systems and methods according to this disclosure will be described as being particularly adaptable to being hosted on common commercial-off-the-shelf hand-held wireless devices such as smartphones, tablets, PDAs and the like, but should not be considered as being limited to only these devices. Any common wireless computing device that may be particularly discretely concealed by a user, and which may be adapted according to the specific capabilities discussed in this disclosure is contemplated as being covered by the following description.

Individual features and advantages of the disclosed systems and methods will be set forth in the detailed description that follows, and will be, in part, obvious from the detailed description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person of ordinary skill in the relevant art may recognize that other components and configurations may be used without departing from the spirit and scope of the subject matter of this disclosure.

Various aspects of the disclosed embodiments relate to a system and a method for discretely and automatically assessing characteristics of a target network, particularly those characteristics that may indicate vulnerabilities of the target network and the devices connected thereto, to unauthorized intrusion, up to and including cyber-attack, using a user's own local hand-held wireless device for accessing the target network via one or more wireless access points. The user's own local hand-held wireless device may be autonomously employed for signal detection, wireless network access and a specific level of network analysis using an adapted program stored in, or executed by, the user's own local hand-held wireless device. The systems and methods according to this disclosure may employ a corresponding computer-readable medium, with a program stored thereon, which is accessible to the user's own local hand-held wireless device for execution.

The disclosed embodiments may be advantageously operated in a local computing environment. In this regard, a user's own local hand-held wireless device may be operated within the local computing environment discretely and automatically so as to minimize or eliminate an opportunity for a user, or even an administrator, of the local computing environment to be made aware that an external assessment of any kind, including an assessment of a vulnerability of the local computing environment to intrusion is ongoing.

FIG. 1 illustrates a schematic diagram of an exemplary local networked computing environment 100 with which the systems and methods according this disclosure may operate. As shown in FIG. 1, and as is commonly understood, the exemplary local networked computing environment 100 may include any combination of a plurality of workstations 130A-G of various types coupled to, or in direct or networked communication with, one or more servers 140A-B. Individual components of the exemplary local networked computing environment 100 may be individually connected to each other, or otherwise in communication with each other via some sort of central mainframe (not shown), by combinations of wired and wireless communication between individual elements.

A user's own local hand-held wireless device 110 may be provided to communicate with the exemplary local networked computing environment 100 via one or more wireless access points 120A-C. The user's own local hand-held wireless device 110 may be configured to randomly search for available wireless access points and to connect with the exemplary local networked computing environment 100 via those wireless access points 120A-C. It is based on this ability of such an exemplary user's own local hand-held wireless device 110 to communicate directly with the exemplary local networked computing environment 100 via any wireless access point that represents the portal by which the local networked computing environment 100 may susceptible to intrusion.

The user's own local hand-held wireless device 110 may constantly or periodically attempt to access the exemplary local networked computing environment 100 according to a predetermined access scheme. The user's own local hand-held wireless device 110 may be available according to the details below to assess (1) an ability to connect to the exemplary local networked computing environment 100 via one or more wireless access points 120A-C, whether password-protected or not; (2) a strength of a signal received from the one or more wireless access ports 120A-C; and (3) an own device's ability to scan the local networked computing environment 100, including individual portals and devices connected thereto, and to capture wireless packets as such capabilities are available in the user's own local hand-held wireless device 110.

It should be noted that each of the wired and wireless data communications lines between the various components shown in FIG. 1 are unnumbered because one of ordinary skill in the art will recognize that such internal communications could be displayed and/or depicted in a virtually a limitless combination of connections between individual components and devices, as displayed in exemplary manner attached to the exemplary local networked computing environment 100 shown in FIG. 1.

As will be discussed in detail below, once the user's own local hand-held wireless device 110 gains access to the exemplary local networked computing environment 100, the user's own local hand-held wireless device 110 may be manually activated by the user to commence a process by which the user's own local hand-held wireless device 110 connects to various components, whether password-protected or not to assess the vulnerability of those individual components to, for example, cyber-attack or other intrusion into the exemplary local networked computing environment 100. In this manner, at least a first level vulnerability assessment may be autonomously performed by a user by simply activating the process with the user's own local hand-held wireless device 110 and further simply remaining in range of the one or more wireless access points 120A-C such as, for example, by simply walking through a physical area covered by the wirelessly-accessible local networked computing environment 100.

Figure 2:
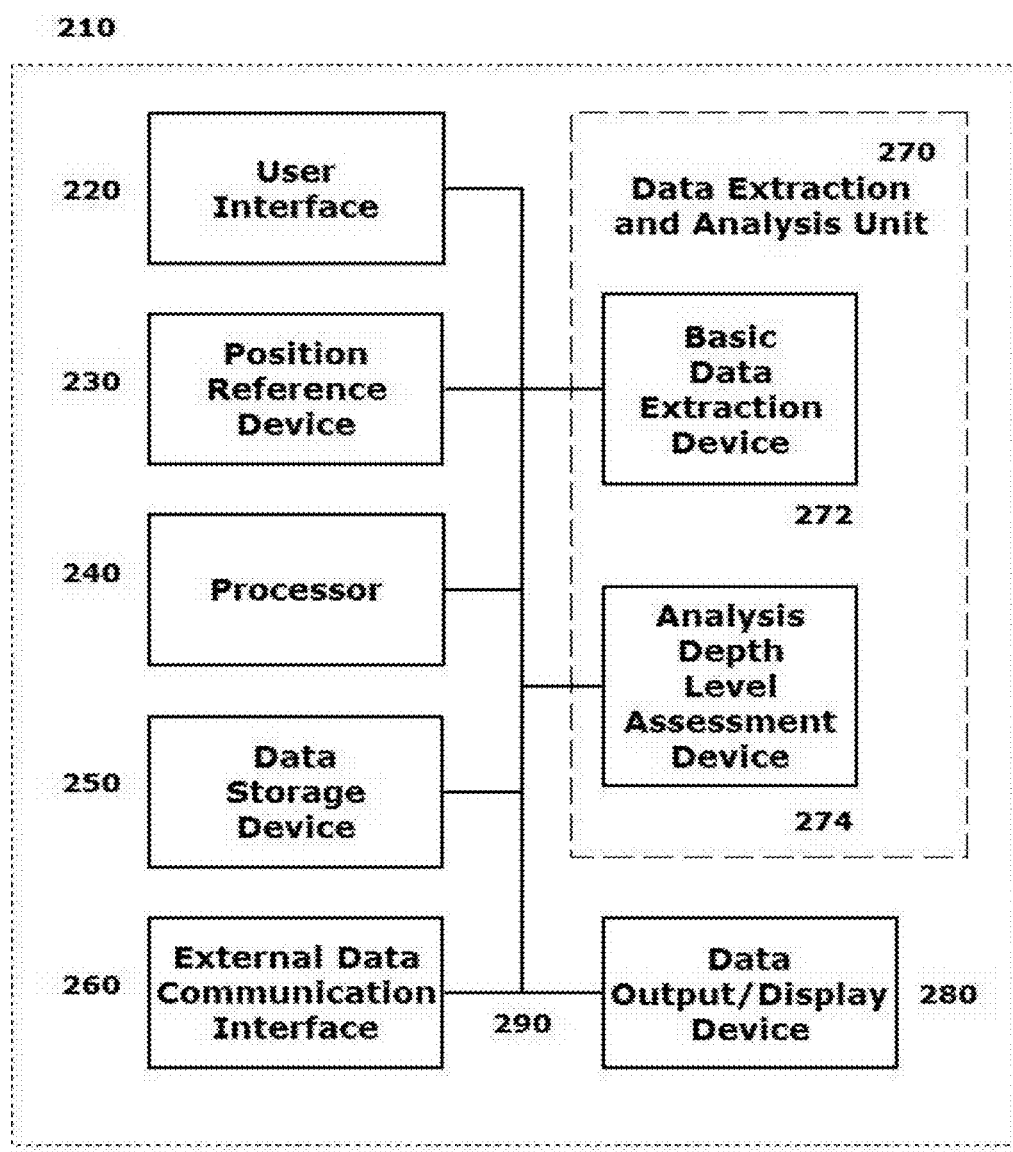
FIG. 2 illustrates a block diagram of an exemplary system for discretely and automatically assessing a wirelessly-accessible network according to this disclosure.

FIG. 2 illustrates a block diagram of an exemplary system for discretely and automatically assessing a wirelessly-accessible network according to this disclosure. The exemplary system 210 shown in FIG. 2 may be embodied in, for example, the user's own local hand-held wireless device 110, such as that discussed above with reference to FIG. 1. Otherwise, portions of the exemplary system 210 shown in FIG. 2 may be housed in a remote location, such as remote server (not shown) with which the user's own local hand-held wireless device 110 may be in electronic communication. An objective of the systems and methods according to this disclosure, however, is to house the data acquisition, processing and analysis functions locally in the user's own local hand-held wireless device 110. This objective supports a goal of providing discrete and autonomous assessment of the wirelessly-accessible network by a user's own local hand-held wireless device 110 (see FIG. 1) to determine susceptibility of the wirelessly-accessible network to intrusion and cyber-attack. In this regard, the system 210 may be housed in virtually any commercial-off-the-shelf hand-held wireless device such as, for example, a smartphone, a tablet, a PDA or other like device.

The system 210 may include a user interface 220 by which the user may communicate with the system 210. The user interface 220 may be configured as one or more conventional mechanisms common to hand-held wireless devices such as those listed above. The user interface may permit a user to input information to the system 210 in order to, for example, to activate an assessment methodology according to this disclosure. An objective of such activation would be to simply begin an automated assessment process requiring little, if any, additional user interaction while the system 210 performs the automated data collection and assessment functions. The user interface 220 may include, for example, an integral keyboard by which the user may communicate with the system 210. In exemplary embodiments, a specific user interface 220 may include simply a "hot key" for activating the specific assessment methodology according to this disclosure. The user interface 220 may alternatively include (1) a touchscreen with "soft" buttons; (2) various components for use with a compatible stylus; (3) a microphone by which a user may provide oral commands to the system 210 to be "translated" by a voice recognition program or otherwise; or (4) other like device for user activation of, and communication with the data collection and analysis methodology embodied in the system 210.

The system 210 may optionally include one or more position reference devices 230. Such position reference devices 230 may comprise a GPS receiver for receiving global positioning satellite location information to the system 210, and/or may include an inertial navigation system or other like device that can localize the position of the system for use. Information regarding a position of the system 210 may prove beneficial in providing additional data which may be of use in the assessment of the specific target network system, particularly with regard to the position of any specific wireless access point that is accessed by the system 210.

The system 210 may also include one or more local processors 240 for individually operating the system 210 and carrying out data collection, processing, assessment and control functions such as those that will be described in detail below. Processor(s) 240 may include at least one conventional processor or microprocessor that interprets and executes instructions to direct specific data collection and storage functions with regard to any specific target wireless network. Processor(s) 240 may initiate and control of the data collection and analysis efforts of the system 210 once those efforts are initiated by, for example, manual input by a user via the user interface 220. The data collection and analysis efforts, once initiated, may be controlled by the processor(s) 240 to continue for some predetermined period of time, or until some other predetermined data collection criterion is met, at which point the processor 240 may suspend the data acquisition and/or analysis functions. It should also be understood that the processor(s) 240 may control only the data acquisition process, while analysis and assessment may need to be separately undertaken either locally or in communication with, for example, a remote server (not shown).

The system 210 may include one or more data storage devices 250. Such data storage device(s) 250 may be used to store data or operating programs to be used by the system 210, and specifically the processor(s) 240. Data storage device(s) 250 may be used to collect information regarding, for example, signal strengths, security implementations and other related information regarding wirelessly-accessible networks. The data storage device(s) 250 may facilitate the collection of data in an initial inconspicuous data collection sweep performed by a user, and store such data for the user to remove the system 210 to a remote location in order to provide some level of detailed analysis of the collected data.

Data storage device(s) 250 may include a random access memory (RAM) or another type of dynamic storage device that is capable of storing collected information, and separately storing instructions for execution of system operations by, for example, processor(s) 240. Data storage device(s) 250 may also include a read-only memory (ROM), which may include a conventional ROM device or another type of static storage device that stores static information and instructions for processor(s) 240. Further, the data storage device(s) 250 may be integral to the system 210, or may be provided external to, and in wired or wireless communication with, the system 210.

The system 210 may include one or more external data communication interfaces 260 by which the system 210 may communicate with components external to the system 210, such as the exemplary wirelessly-accessible local networked computer environment 100 shown, for example, in FIG. 1. Principal external data communication for the system 210 will generally be via at least one external data communication interface 260 configured to detect and communicate with one or more wireless access points, such as those depicted as elements 120A-C in FIG. 1. In other words, a specified one of the external data communication interfaces 260 may be configured as a Wi-Fi receiver usable to detect signals indicative of wireless access points to collect characteristic information regarding target wireless access points, to particularly assess at least a signal strength, e.g., Received Signal Strength Indication or RSSI, and, where appropriate, information on security implementations that may later be usable to assess a vulnerability of a particular wirelessly-accessible network to intrusion and attack. Otherwise, the one or more external data communications interfaces 260 may include any mechanism that facilitates direct communication, or communication via a network environment, for the sharing of results of the processing, collection and analysis undertaken by the system 210.

The system 210 may also include a specific data analysis and extraction unit 270 as a part of a processor 240 coupled to, for example, one or more storage devices 250, or as a separate component module or circuit in the system 210. The data analysis and extraction unit 270 may include at least a basic data extraction device 272 and an analysis depth level assessment device 274. As with all of the components of the system 210, the data analysis and extraction unit 270, with its basic data extraction device 272 and analysis depth level assessment device 274, is preferably housed locally in a user's own local hand-held wireless device, but portions of data analysis and extraction unit 270 may be housed on a remote server (not shown). In this manner, specific data collection may be undertaken locally under control of, for example, one or more processor(s) 240 in the system 210, while analysis functions may occur at a remote location where data collected from a specifically targeted network by the system 210 may be computer analyzed in more detail manner. As indicated above, a specific objective of the systems and methods according to this disclosure remains, however, to house all of the required components for vulnerability assessment and analysis of a wirelessly-accessible network within the user's own local hand-held wireless device 110 (see FIG. 1), which can be inconspicuously carried and operated to perform the data acquisition and analysis discussed in this disclosure.

The basic data extraction device 272 may be provided to perform rudimentary signal acquisition tasks including (1) basic signal strength assessment; and (2) basic security implementations interrogation of a target wireless access point or a target network. The basic data extraction device 272 may, therefore, provide a first level of data for assessment of the vulnerability of the accessed network, and/or devices connected to the accessed network.

An analysis depth level assessment device 274 may be provided to perform higher-level interrogations. For example, the analysis depth level assessment device 274 may cause or control the system 210 to attempt connections to wireless access points, which may or may not be secured, i.e., password-protected. Depending on a robustness in the programming of the exemplary analysis depth level assessment device 274, functions such as, for example, determining whether a wireless access point is secured or otherwise unsecured may be undertaken. In instances where a wireless access point is unsecured, the analysis depth level assessment device 274 may execute functions required to connect to the network via the wireless access point and perform network and/or portal scans. Again, depending on the details of the functions provided by the analysis depth level assessment device 274, in instances where a wireless access point is determined to be secured, the analysis depth level assessment device 274 may attempt to execute connection with the network using common authentication passwords. These common authentication passwords may, for example, be stored in one or more data storage devices 250. Further, and again depending on the program functionality, the analysis depth level assessment device 274 may execute functions to perform, for example, data packet collection and/or WEP cracking. As indicated above, is intended that, once initiated, the data collection and at least first level analysis may be provided locally by the system 210 covertly carried by a user in the targeted, wirelessly accessible local computing network environment (see FIG. 1).

The system 210 may include at least one data output/display device 280 which may be configured as one or more conventional mechanisms that output information to the user, including a display screen on the user's own local hand-held wireless device. The data output/display device 280 may separately be an output port for connection to a printer, a copier, a scanner, a multi-function device, or a remote storage medium, such as a memory in the form, for example, of a magnetic or optical disk with a corresponding disk drive or otherwise a remote server as discussed above. In instances where only the data collection functions are undertaken locally with the system 210, at least one data output/display device 280 may be specifically used to facilitate download of collected data regarding the one or more wirelessly-accessible targeted networks in order that the analysis of the collected data, to include further analysis depth level assessment, or data export to a user may be accomplished on a separate computing platform. Any suitable data connection in wired or wireless communication with an external data repository or external data analysis unit is contemplated to be encompassed by the at least one data output/display device 280.

All of the various components of the system 210, as depicted in FIG. 2, may be connected by one or more data/control busses 290. These data/control busses 290 may provide wired or wireless communication between the various components of the system 210, whether all of those components are housed integrally in, or are otherwise external and connected to, the user's own local hand-held wireless device.

It should be appreciated that, although depicted in FIG. 2 as an integral unit, the various disclosed elements of the system 210 may be arranged in any combination of sub-systems as individual components or combinations of components, integral to a single unit, or external to, and in wired or wireless communication with the single unit of the system 210. In other words, no specific configuration as an integral unit or as a support unit is to be implied by the depiction in FIG. 2. Further, although depicted as individual units for ease of understanding of the details provided in this disclosure regarding the system 210, it should be understood that the described functions of any of the individually-depicted components may be undertaken, for example, by one or more processors 240 connected to, and in communication with, one or more data storage devices 250.

The disclosed embodiments may include a method for detecting wireless access points and for quantifying characteristic of the detected wireless access points to include, for example, an assessment of signal strengths of the wireless access points, or security implementations associated with the wireless access points, or with networks and network devices that may be accessed via the wireless access points. The method may obtain a signal that indicates the user desires to commence the assessment process. The method may then cause the user's own local hand-held wireless device to commence automatically collecting and recording information regarding wireless access points within a range of user's own local hand-held wireless device at predetermined intervals. Depending on a sophistication of an analysis depth level, the method may determine whether a target wireless access point is secured. If the method determines that the target wireless access point is secured, the method may attempt connection to the secured wireless access point using common authentication passwords. Once a connection is made with a target wireless access point, whether secured or unsecured, the method may connect via the target wireless access point and begin performing network and portal scans, all the while collecting and storing information based on the scans. Again depending on the level sophistication of the analysis depth level, the method may attempt to perform packet collection and/or WEP cracking and/or other appropriate data collection tasks by which ultimately an analysis of a vulnerability or susceptibility to intrusion and attack of the target network may be assessed. The method may continue the data collection via the target wireless access point until the collection portion of the method is stopped. Such a stop in the collection effort may be signaled by user manual input, a predetermined elapsed time being reached, or some other specified collection criterion being achieved. The method may analyze the gathered data in order to produce a first level of initial vulnerability assessment. The analysis of the data and the detail of the initial assessment will vary depending on the sophistication of the analysis depth level and the computing resources of the user's own local hand-held wireless device. The method may then export raw data and the first level analysis to a remote user for additional analysis or other review.

Figure 3:
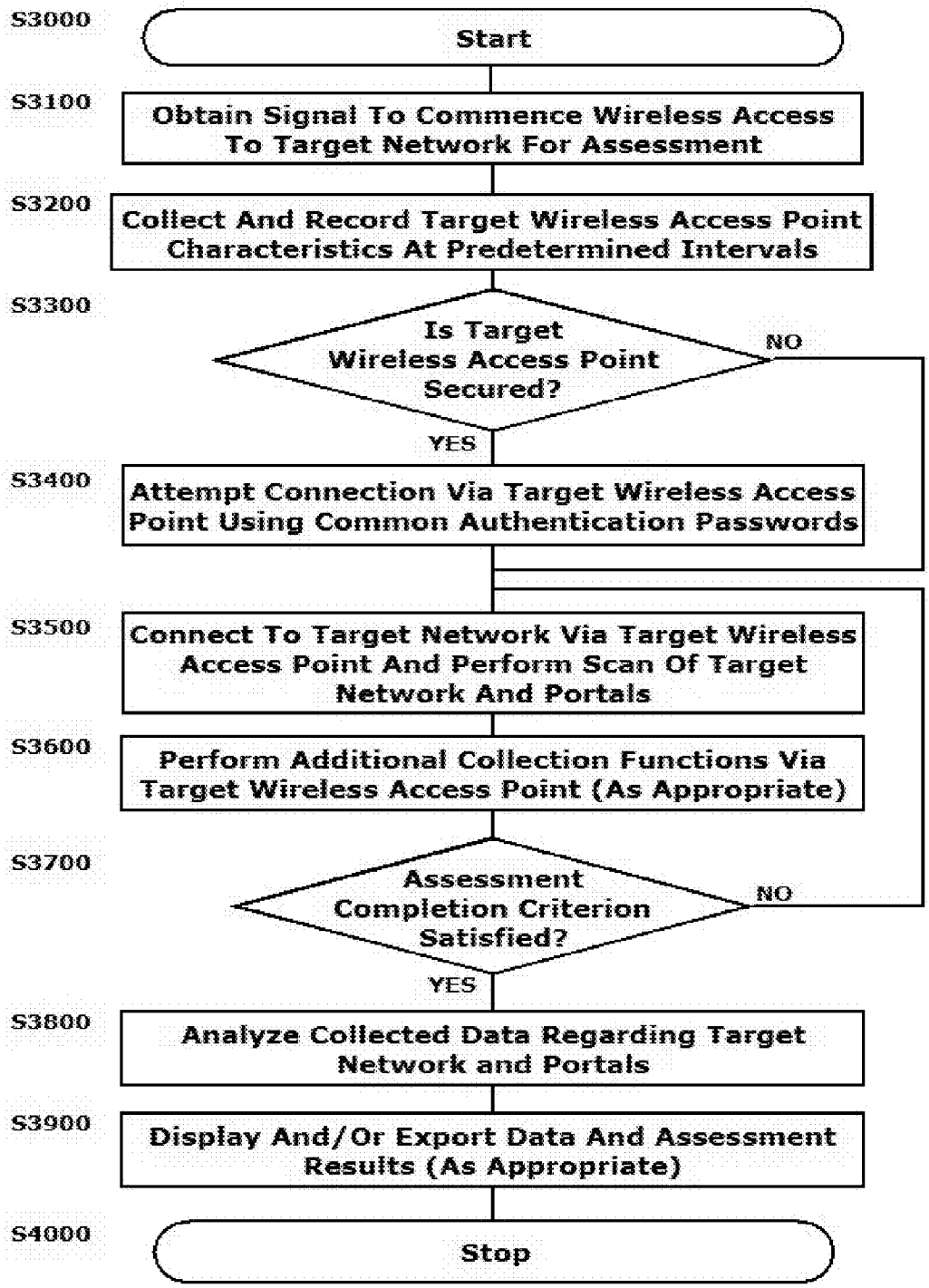
FIG. 3 illustrates a flowchart of an exemplary method for discretely and automatically assessing a wirelessly-accessible network according to this disclosure.

FIG. 3 illustrates a flowchart of an exemplary method for discretely and automatically assessing a wirelessly-accessible network according to this disclosure. As shown in FIG. 3, operation of the method commences at Step S3000 and proceeds to Step S3100.

In Step S3100, the method may commence the data collection process by receiving a signal from a user, generally when the user's own local hand-held wireless device is positioned within range of one or more target wireless access points. Such signal maybe manually generated by the user activating a user interface on the user's own local hand-held wireless device. The manual generation may be, for example, via user activating the keyboard or touch screen or by using a voice command. Operation method proceeds to Step S3200.

In Step S3200, the user's own local hand-held wireless device receives data from one or more target wireless access points via, for example, a Wi-Fi receiver in the user's own local hand-held wireless device and assesses characteristics of the one or more target wireless access points. These characteristics include, for example, a signal strength or RSSI, security implementation and other like data for the one or more target wireless access points. The data may be collected from the target wireless access points at predetermined intervals. Such predetermined intervals may be, for example, on an order of each 1-2 seconds, or as often as the processing capability of the user's own local hand-held wireless device may permit. Operation of the method proceeds to Step S3300.

Step S3300 is a determination step. In Step S3300, a determination is made regarding whether the one or more target wireless access points are secured. If in Step S3300 it is determined that the one or more target wireless access point is unsecured, operation the method proceeds to Step S3500.

If in Step S3300 it is determined that the information regarding the one or more target wireless access points is secured, operation of the method proceeds to Step S3400.

In Step S3400, the method may attempt connection with the one or more target wireless access points using common authentication passwords. Such common authentication passwords may be stored in one or more data storage devices in the user's own local hand-held wireless device. Data regarding an ability to access one or more target wireless access points using some common authentication password will be collected to aid in the later assessment of the vulnerability of the particular network to intrusion and/or attack. Operation of the method proceeds to Step S3500.

In Step S3500, once access is gained to a target network via the one or more target wireless access points, connections made to the target network and a scan of the target network, associated portals, and even connected devices may be commenced. Basic level information regarding characteristics of the wireless access points, the network, the portals, connected devices and the like may be collected. Operation of the method proceeds to Step S3600.

In Step S3600, depending on the computing power of user's own local hand-held wireless device, and a sophistication of an analysis depth level of the stored process, the method may undertake more sophisticated or detailed data collection. Such additional data collection may include performing WEP cracking or other like data collection from the target network, associated portals, associated devices and the like. Operation of the method proceeds to Step S3700.

Step 3700 is a determination step. In Step S3700, a determination is made regarding whether the data collection portion of method is complete. This determination may be made by the user who may in turn provide manual input to the user's own local hand-held wireless device to terminate the data collection effort. Otherwise, the system may automatically terminate the data collection effort based on reaching a predetermined elapsed time, or some other predetermined data collection criterion. It should be recognized as one of the beneficial aspects of the disclosed method that, once commenced generally on some signal from a user, the operation of the method, particularly a data collection portion, may proceed automatically without requiring further input from the user.

If in Step S3700 it is determined that the data collection operation is not complete, operation of the method reverts to Step S3500.

If in Step S3700 it is determined that the data collection operation is complete, operation of the method proceeds to Step S3800

In Step S3800, the method may analyze the collected data locally in the user's own local hand-held wireless device to produce at least a first level assessment regarding a vulnerability of the target wirelessly-accessible network to intrusion and/or cyber-attack. It should be understood, however, that such analysis, particularly if it is to be more rigorous, may be undertaken by connecting the user's own local hand-held wireless device to some other computing station via either a wired or wireless connection in order that the resources of the other computing station may be employed to add more rigor to the analysis of the susceptibility of the target network to intrusion or attack. Operation of the method proceeds to Step S3900.

In Step S3900, the method may display or otherwise export raw data as well as the results of the analysis regarding the susceptibility of the target network to intrusion or attack for the beneficial use of the user of the user's own local hand-held wireless device, or to such other user as may benefit from details of the raw data and the analysis of that data undertaken by the method. Such other user may include, for example, the company that controls the target network and is intent on determining a vulnerability of its network. Such a user may also include groups such as law enforcement entities and government agencies that may beneficially use the collected data and assessment to determine a particular target network's ability to avoid intrusion or otherwise ward off cyber-attack. Operation of the method proceeds to Step S4000, where operation of the method ceases.

The disclosed embodiments may include a non-transitory computer-readable medium storing instructions which, when executed by a processor, may cause the processor to execute all, or at least some, of the steps of the method outlined in paragraph [0053], and otherwise described in detail in paragraphs [0054]-[0066] above.

The above-described exemplary systems and methods reference certain conventional components to provide a brief, general description of suitable communication and processing environments in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described. These may include individual program modules executed by a processor. Generally, program modules include routine programs, objects, components, data structures, and the like that perform particular tasks or implement particular data types in support of the overall objective of data collection, analysis and assessment.

Those skilled in the art will appreciate that other embodiments of the disclosed subject matter may be practiced in communication and data network environments with many types of communication equipment and computer system configurations, including personal computers, hand-held devices, multi-processor systems, microprocessor-based or programmable consumer electronics, and the like. In keeping with an objective of the disclosed subject matter, it is intended that the host device be generally hand-held, or otherwise small in size, in order that the user, i.e., network assessor can discretely, or otherwise covertly, pass through the local networked computing environment accessing one or more target wireless access points to collect relevant vulnerability data, as described above, without alerting users or administrators of the target network to the ongoing collection or assessment effort.

Embodiments according to this disclosure may also be practiced in distributed computing environments where tasks are performed by local and remote processing devices that are linked to each other by hardwired links, wireless links, or a combination of both through a communication network. In a distributed computing environment, program modules may be located in both local and remote memory storage devices. This may be particularly applicable for embodiments according to this disclosure where the collection effort is undertaken locally through use of the user's own local hand-held wireless device, and the analysis, depending on a detail required of that analysis, may occur in a remote server in communication with the user's own local hand-held wireless device.

As indicated above, embodiments within the scope of this disclosure may also include computer-readable media having stored computer-executable instructions or data structures that can be accessed, read and executed by the user's own local hand-held wireless device using a compatible wired or wireless data reader. Such computer-readable media can be any available media that can be accessed by a processor, general purpose or special purpose computer in, or in communication with, the user's own local hand-held wireless device. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a user's own local hand-held wireless device, or a processor in such a user's own local hand-held wireless device, to perform certain of the above-specified functions, individually or in various combinations. Computer-executable instructions may also include program modules that are remotely stored for access by a user's own local hand-held wireless device to be executed by processors in the user's own local hand-held wireless device when that device is caused to communicate in a network environment.

The exemplary depicted sequence of executable instructions or associated data structures represents one example of a corresponding sequence of acts for implementing the functions described in the steps. The exemplary depicted steps may be executed in any reasonable order to affect the objectives of the disclosed embodiments.

Although the above description may contain specific details, they should not be construed as limiting the claims in any way. Other configurations of the described embodiments of the disclosed systems and methods are part of the scope of this disclosure. For example, the principles of the disclosure may be applied to each individual user where each user may individually deploy such a system. This enables each user to employ the benefits of the disclosure even if any one of the large number of possible applications do not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for assessing network vulnerabilities for a secure target wireless network, comprising:

attempting to access the secure target wireless network via one or more wireless access points that provide access to the secure target wireless network with a hand-held wireless device;

recovering a plurality of individual commonly-used authentication passwords from a list of commonly-used authentication passwords stored in the hand-held wireless device;

automatically applying, with the hand-held wireless device programmed to employ common authentication protocols, each of the plurality of individual commonly-used authentication passwords to attempt to connect to the secure target wireless network via the one or more wireless access points;

automatically scanning the secure target wireless network with the hand-held wireless device to collect data on the secure target wireless network;

collecting information, with the hand-held wireless device, regarding relative signal strengths of signals from the one or more wireless access points;

storing the collected data and the collected information regarding the relative signal strengths in the hand-held wireless device;

analyzing the stored data and the stored information to produce an assessment of a vulnerability of the secure target wireless network to intrusion; and outputting the results of the analysis in a usable format for a user, the hand-held wireless device being programmed to autonomously undertake all of the attempting to access, recovering, automatically applying, automatically scanning, collecting, storing, analyzing and outputting.

2. The method of claim 1, wherein the method is initiated on a manual signal from the user via a user interface in the hand-held wireless device.

3. The method of claim 2, further comprising automatically terminating the automatically scanning the target network and the storing the collected data based on a predetermined period of time elapsing from initiation of the method by the user.

4. The method of claim 1, wherein:
the accessing, the automatically scanning and the storing are accomplished autonomously by the hand-held wireless device, and
the analyzing of the stored data and the outputting of the results are accomplished by a remote computing device communicating with the hand-held wireless device.

5. The method of claim 1, wherein the collected data includes-security implementations for the one or more wireless access points.

6. The method of claim 5, wherein the collected data further includes Wired Equivalent Privacy cracking.

7. The method of claim 1, wherein:
the hand-held wireless device is one of a smartphone, a tablet and a PDA, and
the hand-held wireless device is a stand-alone device for performing all of the steps of the method.

8. A hand-held wireless device for assessing network vulnerabilities for a secure target wireless network, comprising:
an external data communication interface configured as a receiver for receiving wireless signals passively from one or more wireless access points that provide access to one or more secure target wireless networks;
a storage device that stores a list of commonly-used authentication passwords;
a processor that is programmed to
(1) direct a process for automatically scanning the one or more secure target wireless networks with the hand-held wireless device,
(2) recover a plurality of individual commonly-used authentication passwords from the store list of commonly-used authentication passwords,
(3) direct automatic attempts to connect via the one or more wireless access points using common authentication protocols, each of the plurality commonly-used authentication passwords being automatically applied in the automatic attempts to connect to the secure target wireless network via the one or more wireless access points,
(4) collect data on at least one of the one or more wireless access points and the one or more secure target wireless networks to support a vulnerability assessment of the one or more secure target wireless networks to intrusion,
(5) collect information regarding relative signal strengths of signals from the one or more wireless access points,
(6) store the collected data and the collected information regarding relative signal strengths in the storage device, and
(7) analyze the stored collected data and the stored collected information to produce the vulnerability assessment for the one or more secure target wireless networks; and
an output device that outputs a result of the vulnerability assessment to a user of the hand-held wireless device.

9. The hand-held wireless device of claim 8, wherein the output device further comprises a display device for locally displaying the result of the vulnerability assessment.

10. The hand-held wireless device of claim 8, wherein the hand-held device is one of a smartphone, a tablet or a PDA.

11. The hand-held device of claim 8, further comprising a user interface by which the user provides a manual signal to the processor to initiate the process.

12. The hand-held device of claim 11, wherein the processor is further programmed to automatically terminate the process for the automatically scanning based on a predetermined period of time elapsing from initiation of the process by the user.

13. The hand-held device of claim 8, wherein:
the output device outputs the stored collected data via a wireless connection to a remote server, and
the remote server includes at least an analyzing device that analyzes the output stored collected data to produce the vulnerability assessment of the one or more secure target wireless networks.

14. The hand-held device of claim 8, wherein the collected data further includes security implementations for the one or more wireless access points.

15. The hand-held device of claim 14, wherein the collected data further includes Wired Equivalent Privacy cracking.

16. The hand-held wireless device of claim 8, wherein the hand-held wireless device is a stand-alone device for autonomously performing all steps of data collection and analysis supporting the vulnerability assessment of the target network.

17. A non-transitory computer-readable medium storing instructions which, when executed by a processor in a hand-held wireless device, cause the processor to execute a method for assessing network vulnerabilities for a secure target wireless network, comprising:
attempting to access the secure target wireless network via one or more wireless access points that provide access to the secure target wireless network with a hand-held wireless device;
recovering a plurality of individual commonly-used authentication passwords from a list of commonly-used authentication passwords stored in the hand-held wireless device;
automatically applying each of the plurality of individual commonly-used authentication passwords to attempt to connect to the secure target wireless network via the one or more wireless access points;
automatically scanning the secure target wireless network with the hand-held wireless device to collect data on the secure target wireless network;
collecting information regarding relative signal strengths of signals from the one or more wireless access points;
storing the collected data and the collected information regarding the relative signal strengths in the hand-held wireless device;
analyzing the stored data and the stored information to produce an assessment of a vulnerability of the secure target wireless network to intrusion; and
outputting results of the analysis in a usable format for a user.

* * * * *